(12) United States Patent
Buckminster et al.

(10) Patent No.: US 10,006,763 B2
(45) Date of Patent: Jun. 26, 2018

(54) ACCUMULATOR ASSEMBLY FIXTURE

(71) Applicant: Radoil, Inc., Houston, TX (US)

(72) Inventors: William Frank Buckminster, Taylorsville, NC (US); Joseph Henry, Oklahoma City, OK (US)

(73) Assignee: Reel Power Licensing Corp., Oklahoma City, OK (US)

( * ) Notice: Subject to any disclaimer, the term of this patent is extended or adjusted under 35 U.S.C. 154(b) by 341 days.

(21) Appl. No.: 14/466,934

(22) Filed: Aug. 22, 2014

(65) Prior Publication Data

US 2015/0343611 A1    Dec. 3, 2015

Related U.S. Application Data

(60) Provisional application No. 62/006,606, filed on Jun. 2, 2014.

(51) Int. Cl.
| | | |
|---|---|---|
| *B23P 19/02* | (2006.01) | |
| *B23P 19/10* | (2006.01) | |
| *B23Q 3/10* | (2006.01) | |
| *G01B 11/27* | (2006.01) | |
| *B23P 19/04* | (2006.01) | |

(52) U.S. Cl.
CPC .......... *G01B 11/272* (2013.01); *B23P 19/022* (2013.01); *B23P 19/10* (2013.01); *B23Q 3/104* (2013.01); *G01B 11/27* (2013.01); *B23P 19/04* (2013.01); *Y10T 29/49396* (2015.01)

(58) Field of Classification Search
CPC ..... G01B 11/27; G01B 11/272; B23P 19/022; B23P 19/10; B23P 19/04; B23Q 3/104; Y10T 29/53; Y10T 29/53052; Y10T 29/53087; Y10T 29/53091; Y10T 29/49394; F15B 2201/60; F15B 2201/605; F15B 2201/61; F15B 2201/615
USPC ................ 29/721, 890.06, 700, 240; 356/72
See application file for complete search history.

(56) References Cited

U.S. PATENT DOCUMENTS

| | | | | |
|---|---|---|---|---|
| 3,297,559 | A | * 1/1967 | Farrow | .................. C25D 17/08 204/242 |
| 3,325,162 | A | * 6/1967 | Lukas | .................... B23Q 3/104 261/119.1 |
| 3,853,038 | A | 12/1974 | Roland | |

(Continued)

FOREIGN PATENT DOCUMENTS

| | | | | |
|---|---|---|---|---|
| CN | 201442170 | * | 4/2010 | ............. B23P 19/04 |
| DE | 41 41 275 A1 | | 6/1993 | |
| WO | WO 2014085552 A1 | * | 6/2014 | ............ B23P 19/022 |

OTHER PUBLICATIONS

CN 201442170 EPO Machine translation; Chang et al.; Jul. 25, 2016; pp. 1-4.*

*Primary Examiner* — Bayan Salone
(74) *Attorney, Agent, or Firm* — Phillips Murrah PC; Martin G. Ozinga

(57) ABSTRACT

A device that helps to properly align and install large pistons in cylinders is disclosed. Large pistons and cylinders are heavy and difficult to handle, and if the piston is not inserted in the cylinder perfectly in line with the length of the cylinder, damage results. The device holds both the piston and cylinder being assembled, and has a number of alignment mechanisms. A laser is also used to set up the device and to ensure that the piston is straight with the center line of the cylinder for proper alignment and insertion.

11 Claims, 16 Drawing Sheets

(56) References Cited

U.S. PATENT DOCUMENTS

| | | | | |
|---|---|---|---|---|
| 3,900,938 | A | 8/1975 | Blomgren, Sr. et al. | |
| 4,319,406 | A * | 3/1982 | Pehrson, Sr. | G01B 5/25 33/286 |
| 4,719,844 | A | 1/1988 | Dugan | |
| 4,817,293 | A * | 4/1989 | Daverio | G01B 11/27 33/228 |
| 4,996,765 | A * | 3/1991 | Maruyama | B23P 19/086 29/795 |
| 5,029,376 | A * | 7/1991 | Sharp, Jr. | B23P 19/022 29/234 |
| 5,095,629 | A * | 3/1992 | Klemer | G01C 15/02 33/293 |
| 5,359,781 | A * | 11/1994 | Melville | G01B 11/27 33/286 |
| 5,453,931 | A * | 9/1995 | Watts, Jr. | G05D 1/0272 180/168 |
| 5,461,793 | A * | 10/1995 | Melville | G01B 11/27 33/286 |
| 5,787,793 | A | 8/1998 | Niwa et al. | |
| 6,234,061 | B1 | 5/2001 | Glasson | |
| 6,317,980 | B2 * | 11/2001 | Buck, III | B21D 47/00 269/37 |
| 6,343,540 | B1 | 2/2002 | Ota et al. | |
| 6,591,484 | B2 | 7/2003 | Cook et al. | |
| 6,886,241 | B2 | 5/2005 | Tachibana et al. | |
| 6,941,645 | B2 * | 9/2005 | Kosuge | B23P 19/043 29/407.04 |
| 7,093,361 | B2 | 8/2006 | Richard | |
| 7,290,476 | B1 | 11/2007 | Glasson | |
| 7,412,773 | B2 * | 8/2008 | Hobel | G01B 11/275 33/286 |
| 7,716,831 | B2 * | 5/2010 | Richard | F15B 15/283 29/832 |
| 7,992,300 | B1 | 8/2011 | Weh et al. | |
| 8,146,417 | B2 | 4/2012 | Glasson et al. | |
| 8,448,563 | B2 | 5/2013 | Wenker et al. | |
| 8,833,036 | B2 * | 9/2014 | Erny | B66B 19/00 33/286 |
| 2003/0051354 | A1 * | 3/2003 | Segerstrom | G01B 11/272 33/286 |
| 2005/0268475 | A1 * | 12/2005 | Hobel | G01B 11/275 33/286 |
| 2013/0015631 | A1 * | 1/2013 | Holland | B60P 3/40 280/98 |
| 2015/0336225 | A1 * | 11/2015 | Trenkle | B23P 19/022 29/240 |

\* cited by examiner

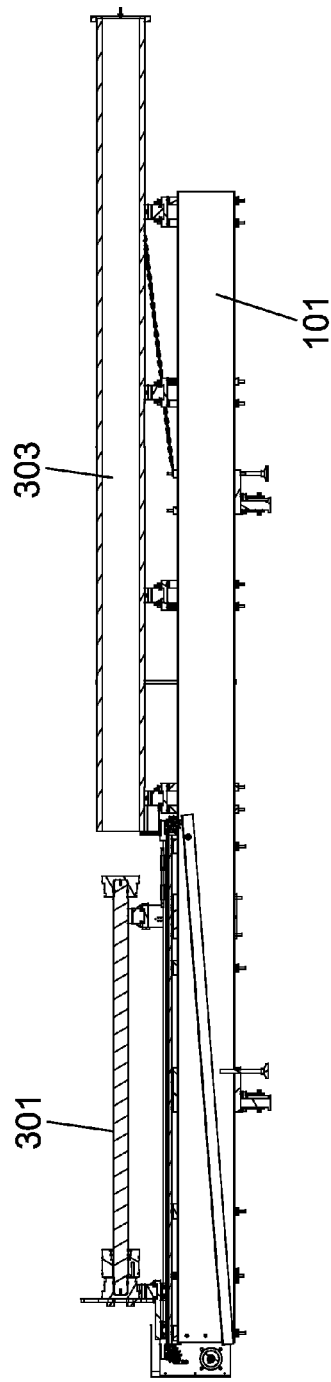
Fig. 11
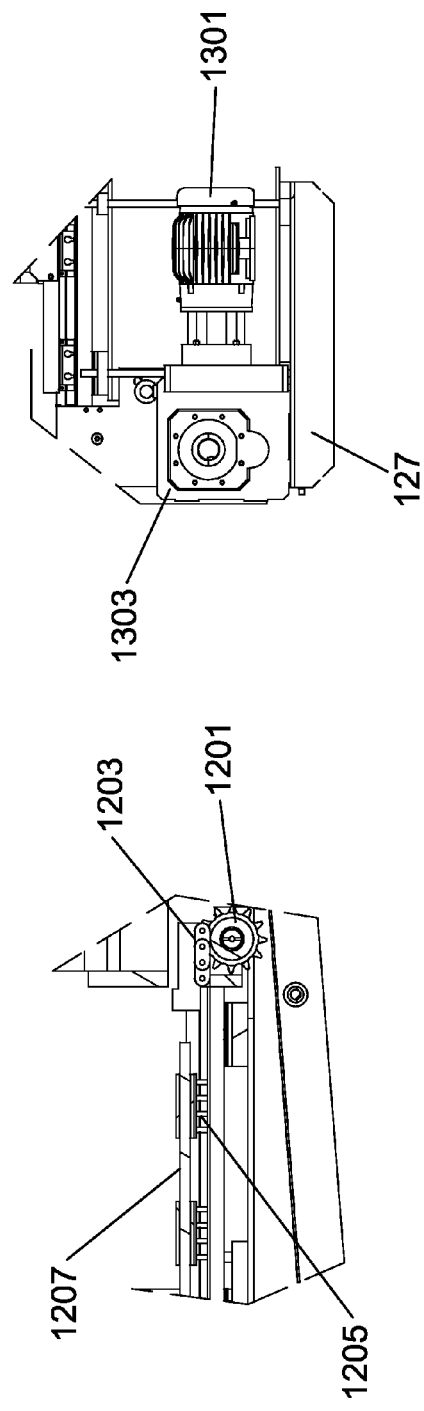
Fig. 12
Fig. 13

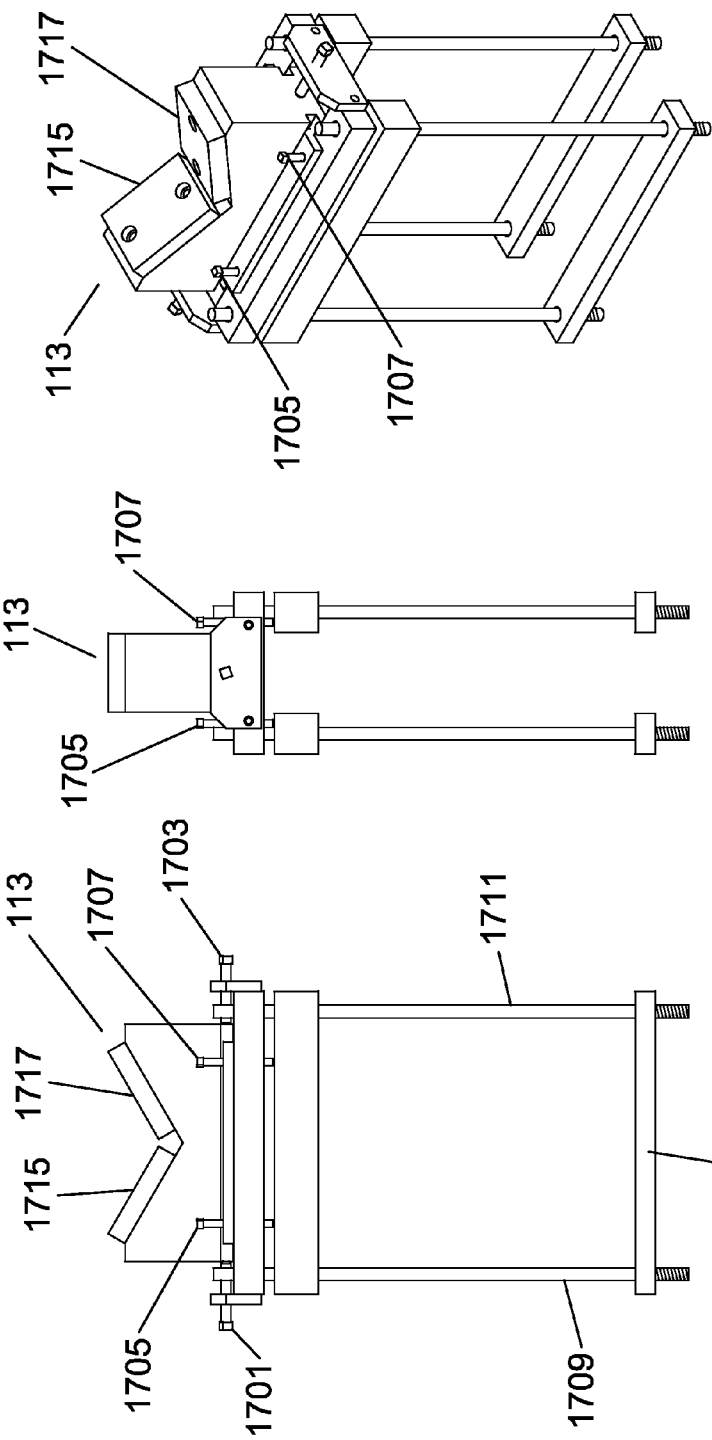

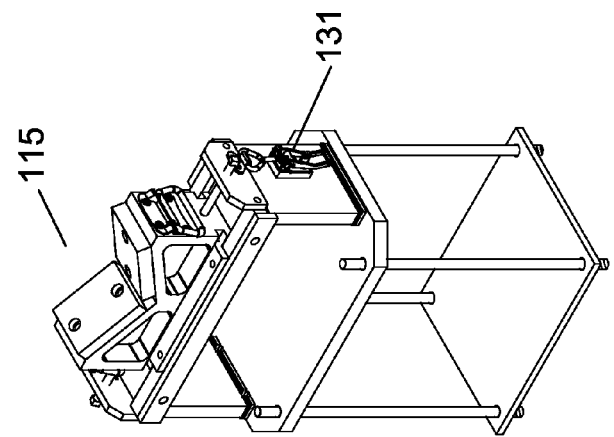
Fig. 22
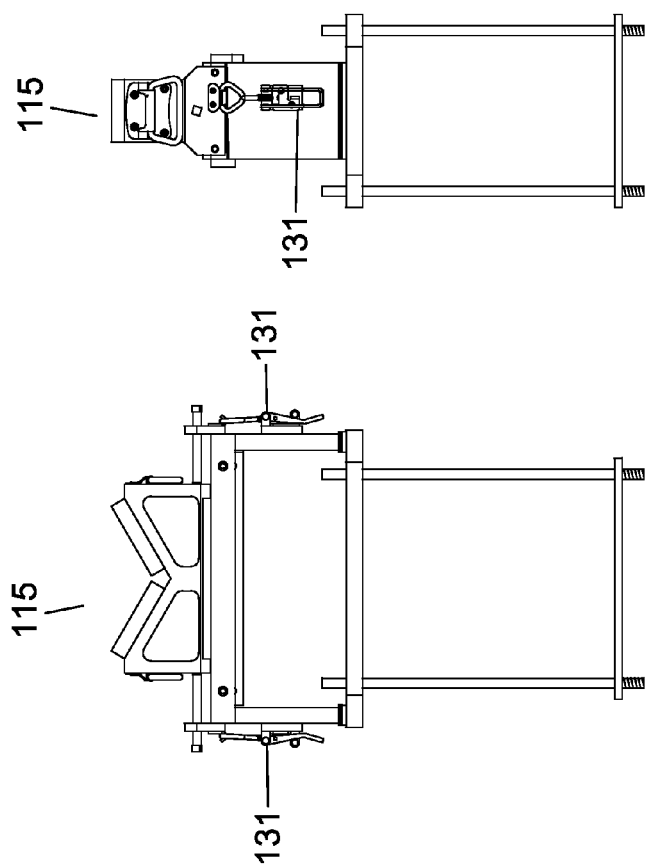
Fig. 21
Fig. 20

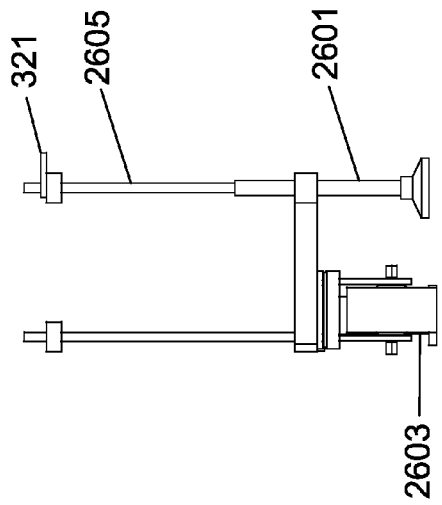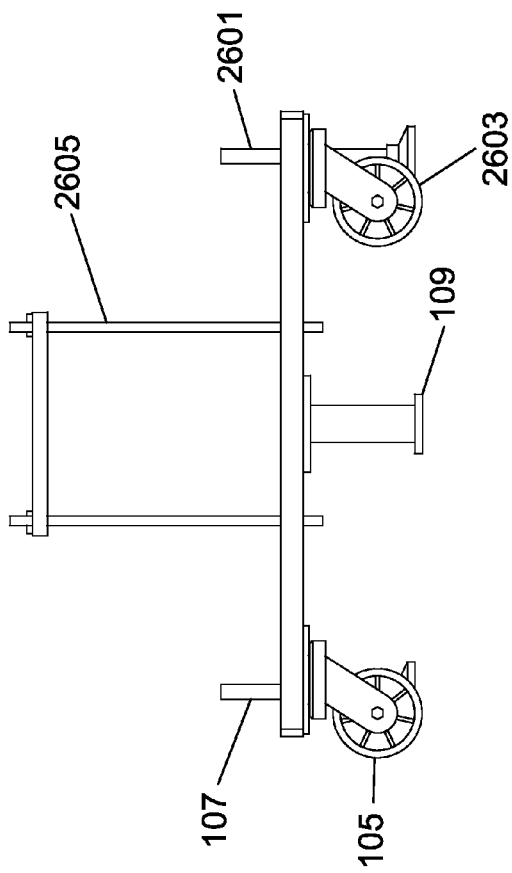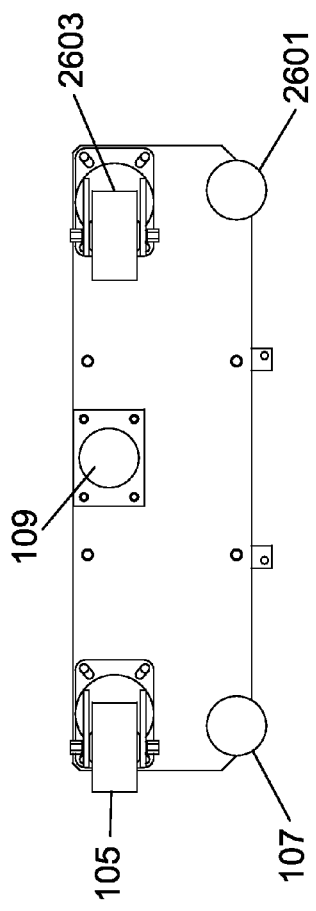

ACCUMULATOR ASSEMBLY FIXTURE

CROSS-REFERENCE TO RELATED PATENT APPLICATIONS

This application claims priority to U.S. patent application Ser. No. 62/006,606 filed Jun. 2, 2014 entitled "Accumulator Assembly Fixture" by William Frank Buckminster and Joseph Henry, the entire disclosure of which is incorporated herein by reference.

BACKGROUND OF THE INVENTION

1. Field of the Invention

This invention relates generally to alignment and installation fixtures, and more specifically to an assembly fixture for the proper installation of large pistons in cylinder assemblies such as those used for accumulators.

2. Description of Related Art

The installation of a large piston in a cylinder such as that used in a subsea accumulator can be difficult, and if the piston is not inserted in the cylinder directly in line with the axis of the cylinder, the resulting damage is costly. Cylinders can become scored or otherwise damaged along their inside bore, and oftentimes this damage renders the cylinder useless for its intended purpose. With large piston and cylinder assemblies, a common practice is to use a number of personnel to align and install the piston in the cylinder. This procedure is problematic, and often does not result in properly aligned piston to cylinder insertion, creating the potential for serious damage to the piston and cylinder assembly.

A similar problem exists when a large piston must be retracted and removed from a cylinder for service, replacement, or the like. In this situation, proper alignment upon removal of the piston from the cylinder is critical to prevent damage of the cylinder wall that can render the cylinder useless for anything other than scrap metal.

What is needed is an assembly fixture for a piston and cylinder, such as an accumulator, that has a number of alignment mechanisms to ensure that the piston is properly inserted in the cylinder. What is also needed is an assembly fixture for a piston and cylinder, such as an accumulator, that uses a laser for precise alignment of the piston with the cylinder. What is also needed is an assembly fixture for a piston and cylinder, such as an accumulator, that reduces the number of personnel needed to insert the piston in the cylinder. What is also needed is an assembly fixture for a piston and cylinder, such as an accumulator, that can also retract a piston from a cylinder while maintaining proper alignment and preventing damage.

The present invention and the various embodiments described and depicted herein solve the above mentioned needs along with other unmet needs that are encountered when inserting and removing large pistons from cylinder arrangements.

BRIEF SUMMARY OF THE INVENTION

In accordance with the present invention, there is provided an accumulator assembly fixture comprising a frame; a plurality of vee blocks attached to the frame; a laser alignment system comprising a laser and a laser alignment block having a laser alignment sight; alignment screws attached to each vee block for aligning each vee block along an insertion axis defined by the laser alignment system; a piston support carriage driven in a linear direction by a drive train; and a push rod for attaching to the piston support carriage and to a piston to be installed or removed from a cylinder.

The foregoing paragraph has been provided by way of introduction, and is not intended to limit the scope of the invention as described in this specification, claims and the attached drawings.

BRIEF DESCRIPTION OF THE DRAWINGS

The invention will be described by reference to the following drawings, in which like numerals refer to like elements, and in which:

FIG. 11 is a cutaway view of the piston and cylinder assembly fixture taken along line A-A of FIG. 9;

FIG. 12 is a close up view of the chain drive assembly of the piston and cylinder assembly fixture;

FIG. 13 is a close up view of the drive train of the piston and cylinder assembly fixture;

FIG. 17 is a plan view of a vee block guide of the piston and cylinder assembly fixture;

FIG. 18 is a rotated plan view of the vee block guide of FIG. 17;

FIG. 19 is a perspective view of the vee block guide of FIG. 17;

FIG. 20 is a plan view of a removable vee block of the piston and cylinder assembly fixture;

FIG. 21 is a rotated plan view of the removable vee block of FIG. 20;

FIG. 22 is a perspective view of the removable vee block of FIG. 20;

FIG. 26 is a side plan view of a carriage of the piston and cylinder assembly fixture;

FIG. 27 is a rotated side plan view of the carriage of FIG. 26;

FIG. 28 is a bottom plan view of the carriage of FIG. 26;

Figure 1:
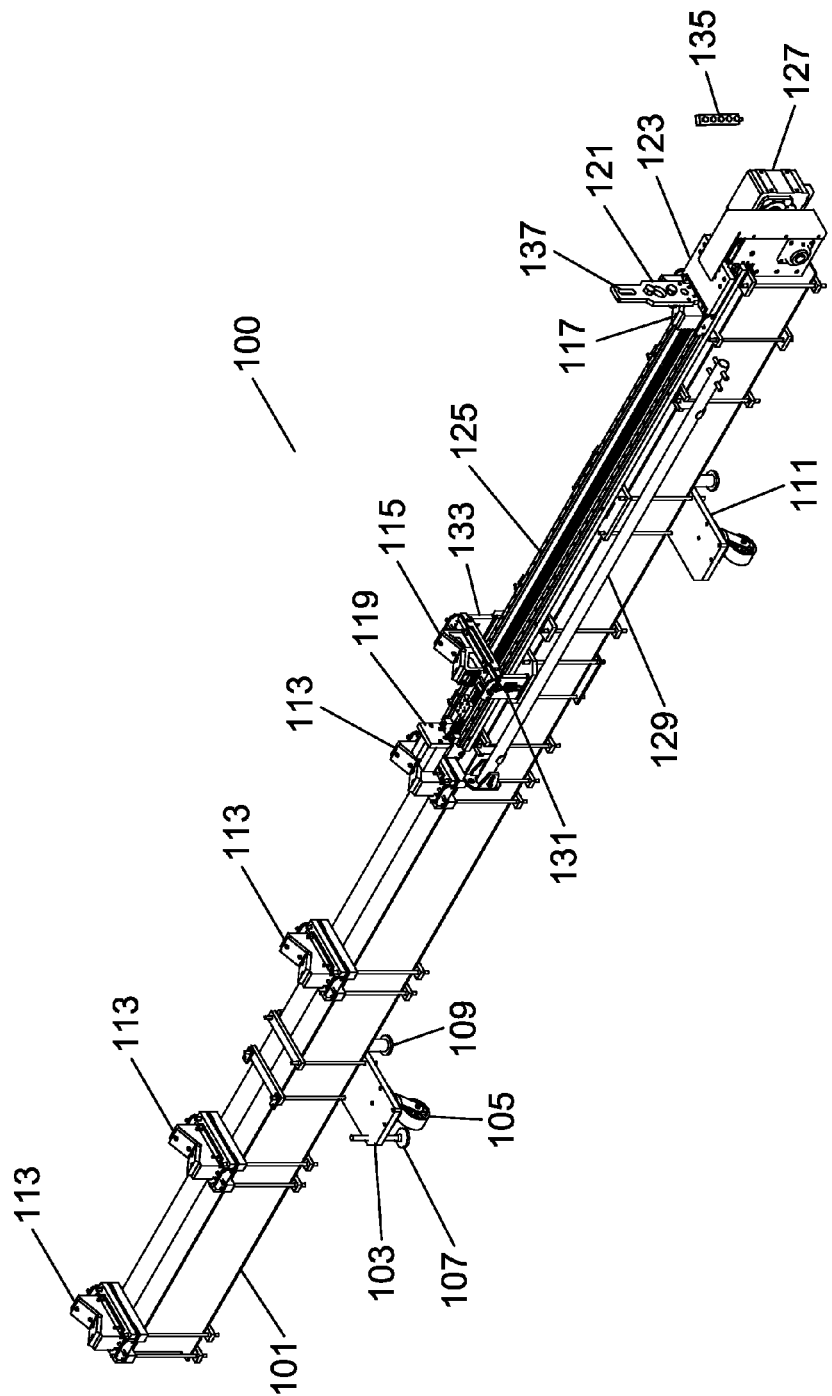
FIG. 1 is a perspective view of the piston and cylinder assembly fixture of the present invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by this specification, claims and the attached drawings.

DESCRIPTION OF THE PREFERRED EMBODIMENTS

Disclosed herein is an assembly fixture for the proper installation and extraction of large pistons in cylinder assemblies such as, but not limited to, those used for accumulators in deepwater drilling operational and control systems.

There are various techniques for the design and construction of the assembly fixture of the present invention. The shape, size, materials and components selected for the assembly fixture may vary based on the intended application. Such adaptations and modifications will become evident to one skilled in the art after reading this specification and claims, and viewing the attached drawings. Further, the methods and techniques that are also disclosed herein are to be included in the spirit and broad scope of the present invention and the various embodiments described and envisioned herein.

For a general understanding of the present invention, reference is made to the drawings. In the drawings, like reference numerals have been used throughout to designate identical elements. It will be recognized that the assembly fixture of the present invention is made from structurally significant parts capable of withstanding the forces involved in the placement, installation, and removal of large pistons and cylinders. Such materials include, for example, machined or cast steel, aluminum, brass, copper, or the like. Other materials such as plastics, carbon fiber, and the like, may also be employed as suitable.

Throughout this specification, the terms accumulator assembly fixture, piston and cylinder assembly fixture and assembly fixture are used interchangeably herein; each term referring to the present invention and the various embodiments described and envisioned herein.

Figure 3:
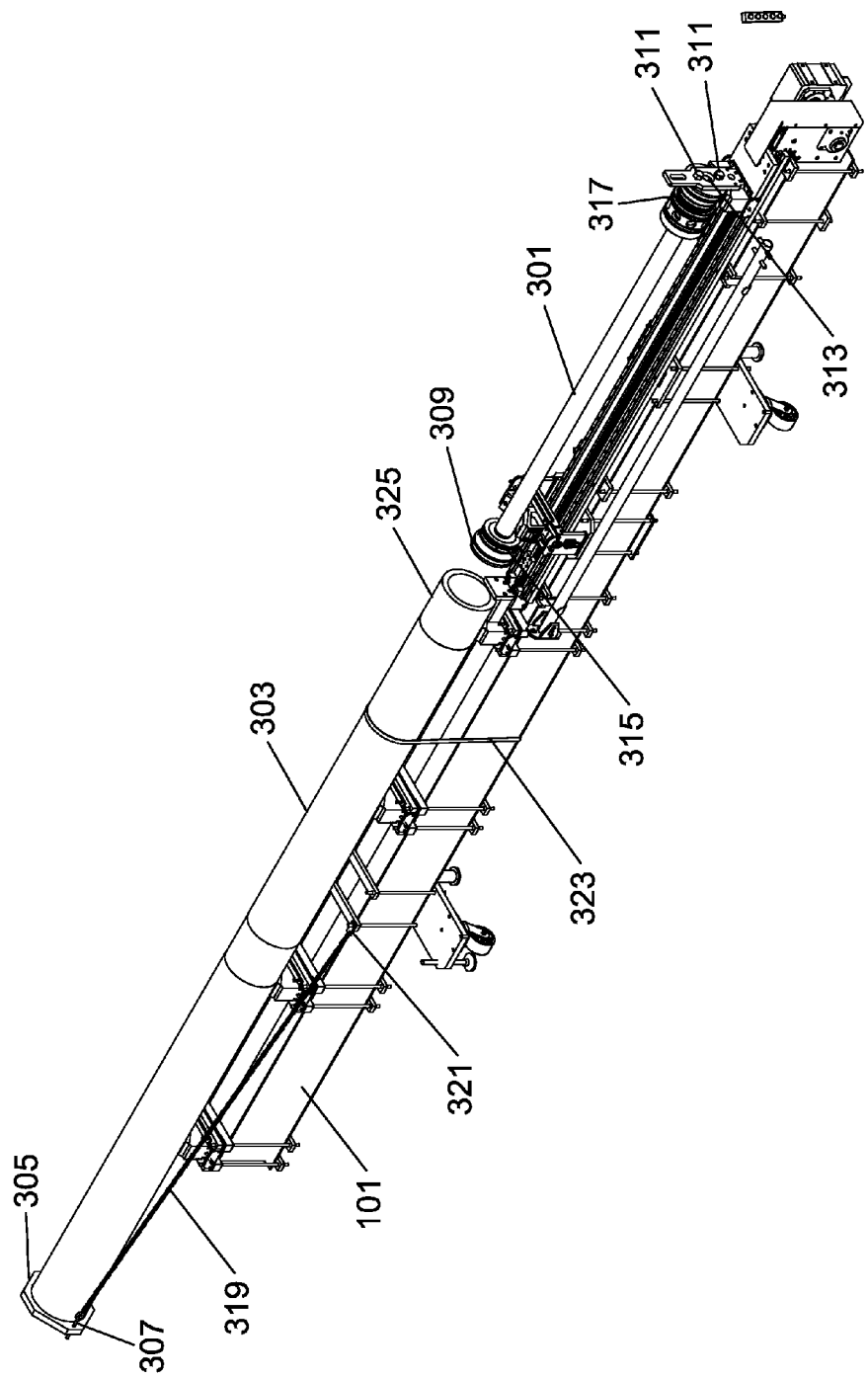
FIG. 3 is a perspective view of the piston and cylinder assembly fixture with a piston and a cylinder ready for assembly.

FIG. 1 is a perspective view of the piston and cylinder assembly fixture 100 of the present invention. The assembly fixture provides both alignment, insertion and extraction capabilities for large piston and cylinder pairs. The assembly fixture 100 is supported on a frame 101 such as a steel beam or the like. The assembly fixture 100 may, in some embodiments of the present invention, be movable to allow setup in various factor locations and also to facilitate storage when not in use. A first carriage 103 can be seen with casters and leveling screws. When the assembly fixture is placed in the proper location for use, leveling screws are used to ensure that the carriage and overall fixture an level and without wobble or other movement. This is of importance when operating the assembly fixture, as an unbalanced assembly fixture can not only make assembly or retraction difficult, but it can represent a hazardous situation for the operator or support personnel. A first caster 105 can be seen along with a first leveling screw 107 and a foot operated movement arrester 109. FIGS. 26-29 show the carriage in further detail. In one embodiment of the present invention, the carriage has two casters or wheels and three leveling screws to provide stability on uneven surfaces such as concrete floors. The assembly fixture 100 has a second carriage 111 with similar casters and leveling screws as the first carriage 103; however, in some embodiments of the present invention carriage 111 has one leveling screw and carriage 103 has two leveling screws so that when the leveling screw is screwed down to lift the fixture, the fixture is stabilized on only three points so as not to twist the frame 101. The assembly fixture 100 supports a cylinder 303 on the left side of the fixture as seen in FIG. 3 and a piston 301 on the right side of the fixture as also seen in FIG. 3. Of course the cylinder may be on the right side and the piston may be on the left side in some embodiments of the present invention. Additionally, in some embodiments of the present invention, the assembly fixture may be oriented vertically such that the piston may be above the cylinder or, in other embodiments of the present invention, the cylinder may be above the piston. A series of vee blocks facilitates retention and movement of the piston and cylinder pair. A series of vee blocks 113 can be seen in FIG. 1 to provide support to a cylinder being assembled or disassembled. The vee blocks will be further described by way of FIGS. 17-19 as they also provide for vital alignment capabilities. A removable vee block 115 can also be seen on the piston side of the assembly fixture for support of a piston. The removable vee block 115 can be taken away or otherwise removed once the piston is inserted far enough into the cylinder by using a latch 131. The removable vee block 115 sits on, for example, support plates 133, and is secured by latches 131 or other fastening devices. A carriage vee block 117 can also be seen attached to a piston support carriage 123 that is driven by a chain or similar arrangement to provide insertion force for the piston to be inserted into the cylinder as well as removal force to extract a piston from a cylinder. A carriage bulkhead 121 provides a surface to push the piston into the cylinder as well as a fastening surface to attach to a piston to be extracted from a cylinder. A chain drive 125 can also be seen that is mechanically coupled to both the piston support carriage 123 and a drive train 127 to provide linear motion to the piston for insertion or removal of the piston to the cylinder. Attached to the frame 101, for storage, is a push rod 129, which will be further described herein, and which serves to facilitate final insertion of the piston in the cylinder. A guide hole or slot 137 can also be seen on the carriage bulkhead 121. The purpose of the slot 137 is to provide a connection point or pass through for a winch cable or the like to be used in the event of a drive train failure. Also seen in FIG. 1 is a control head 135 for operating the assembly fixture. The control head activates the drive train 127 and provides speed and direction to the carriage to facilitate piston insertion and removal. The control head 135 is an electrical controller, wired or wireless, that controls power to the unit, speed, direction of travel, and the like.

Figure 2:
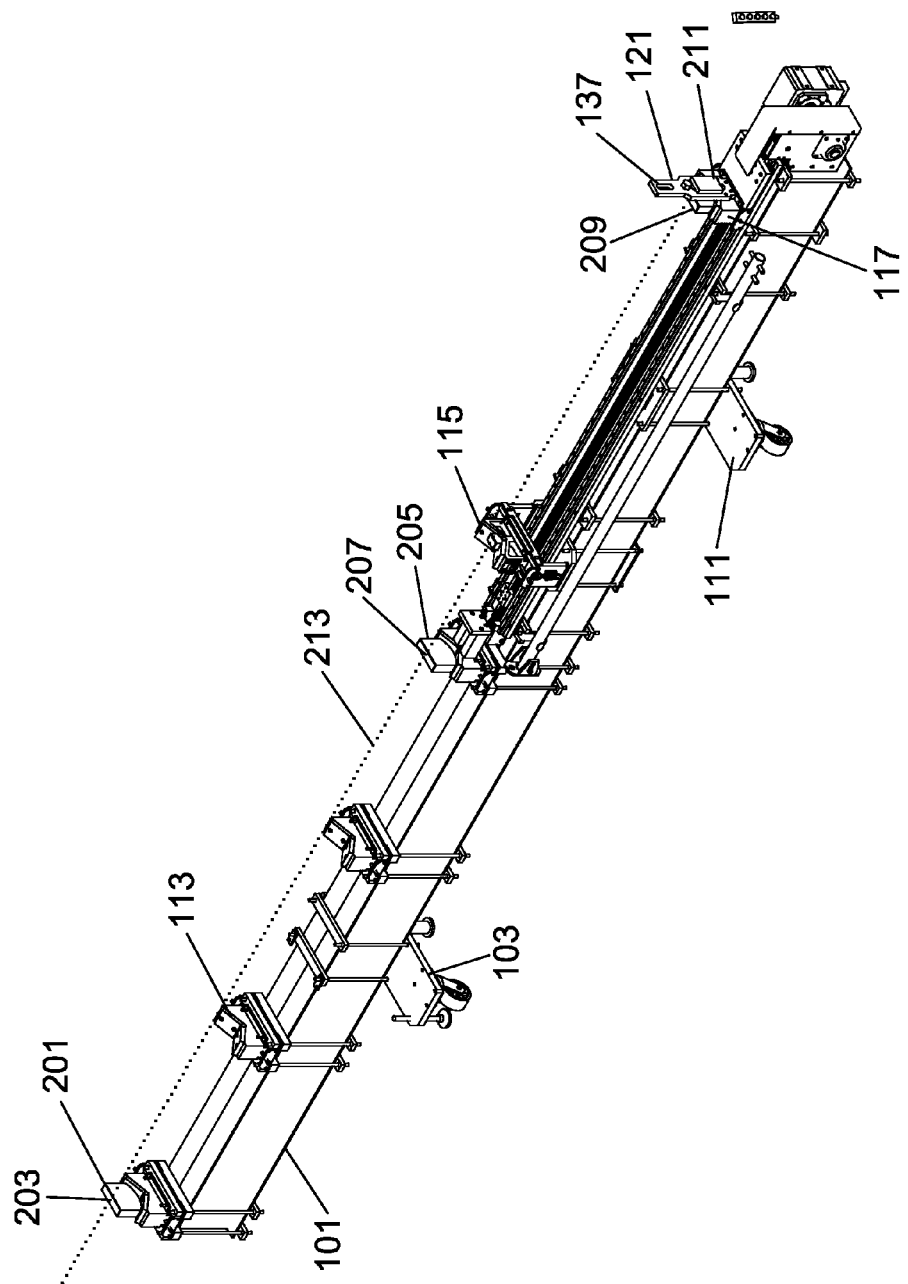
FIG. 2 is a perspective view of the piston and cylinder assembly fixture with the laser alignment system in place.
Figure 25:
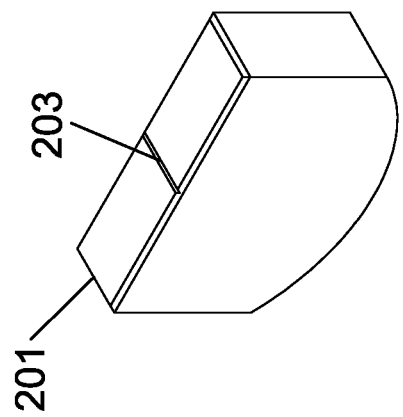
FIG. 25 is a perspective view of the laser alignment block of FIG. 23.
Figure 24:
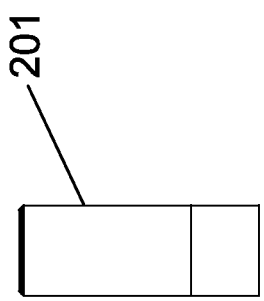
FIG. 24 is a rotated plan view of the laser alignment block of FIG. 23.
Figure 23:
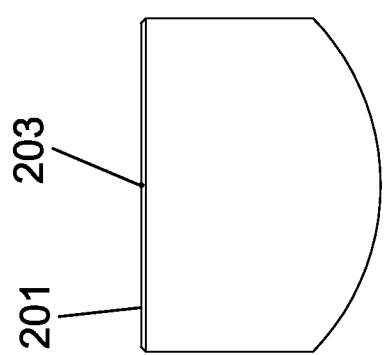
FIG. 23 is a plan view of a laser alignment block of the piston and cylinder assembly fixture.

What has been described thus far is an assembly fixture capable of inserting a piston in a cylinder that may be of large size and mass. While this functionality is important, inserting or removing a piston from a cylinder without damaging O-rings, seals, rings, or the inner wall of the cylinder, is of paramount importance. The assembly fixture of the present invention further comprises a novel arrangement of adjustments that are used in combination with a laser line and laser alignment blocks to align the series of vee blocks that retain the piston and cylinder, thus ensuring that the piston enters or exits the cylinder in proper axial alignment, thus preventing damage to O-rings, seals, rings, the cylinder, or the piston. FIGS. 23-25 depict a laser alignment block while FIG. 2 shows the laser alignment blocks in use during setup of the accumulator assembly fixture. FIG. 2 is a perspective view of the piston and cylinder assembly fixture with the laser alignment system in place. The laser alignment blocks 201, 205, and 209 are configured to rest in a vee block and have a semi-circular section that conforms to the vee block such that the laser sight is collinear with the centerlines of the piston assembly and the cylinder. This can be seen in FIG. 23. The laser alignment blocks have laser sights 203, 207 (the laser sight for laser alignment block 209 is not visible in FIG. 2) that are small notched out or recessed areas in the laser alignment block where a laser line will travel. A laser 211 can be seen in FIG. 2 attached to the carriage bulkhead 121 with a laser line 213 emanating therefrom. A series of adjustment hardware, such as, but not limited to, adjustment screws, and as will be further described by way of FIG. 17, moves the resting surface of the vee block horizontally or vertically in either direction. The adjustment screws are moved for each vee block until the laser line 213 just passes through the laser alignment sight of each laser alignment block. This alignment process ensures that the vee blocks are in alignment with the axis of the cylinder and the axis of the piston, ensuring proper and straight entry and exit of the piston in the cylinder.

FIGS. 3-8 depict a piston being inserted into a cylinder once the alignment process described above is complete. FIG. 3 is a perspective view of the piston and cylinder assembly fixture with a piston and a cylinder ready for assembly. Depicted in FIG. 3 is a piston 301 resting on vee blocks as well as a cylinder 303 resting on vee blocks. To counteract the insertion three and to prevent the cylinder 303 from moving away from the piston during installation, an end stop bracket 305 can be seen fastened to the end of the cylinder 303 and secured with eye bolts 307 (and 3001, see FIG. 30) to a chain 319 that is attached to a grab hook 321 that is in turn fastened to the frame 101. In some embodiments of the present invention, other mechanical retention means such as pins, bolts, brackets, wedges, blocks, plates, and the like may be used for mechanical retention. To prevent the cylinder from rolling off of the vee blocks, a safety strap 323 or other mechanical retention device is placed around the circumference of the cylinder 303 and secured to the frame 101. The safety strap in one embodiment of the present invention is made from a flexible webbing or strapping such as nylon, polypropylene, or the like. Other retention devices such as hooks, clamps, chains, cable, mesh, clamps, or the like may also be used in singular or plural form.

In some embodiments of the present invention, a piston guide adapter 309 is used at the front of the cylinder to ease installation. The piston guide adapter 309 may be made from a plastic, for example. The carriage can be seen at the rear of the piston to provide linear motion by way of the drive train and chain drive to insert or remove the piston 301 from the cylinder 303. To ensure positive retention of the piston 301 to the carriage, carriage to piston bolts 311 may be employed, particularly when the piston 301 is being removed from the cylinder 303. Once the piston 301 is mostly inserted in the cylinder 303, the push rod 129 (see FIG. 7) is coupled to the carriage by way of a push rod fixture 313 at the rear of the piston 317 to provide adequate insertion clearance. The piston front 315 can be seen entering the cylinder in FIGS. 3 and 4. To further facilitate entry of the piston front 315 into the cylinder 303, a turned down section adapter 325 of the cylinder 303 can be seen where the turned down section adapter 325 may be in some embodiments of the present invention, a machined down cylindrical part. The turned down section adapter 325 is concentric with the inside diameter of the cylinder 303 and ensures that the cylinder inside diameter is concentric with the laser line (213, FIG. 2) and piston (301, FIG. 3). The vee block supporting area for the turned down section adapter 325 is located using its own unique laser alignment block.

Figure 4:
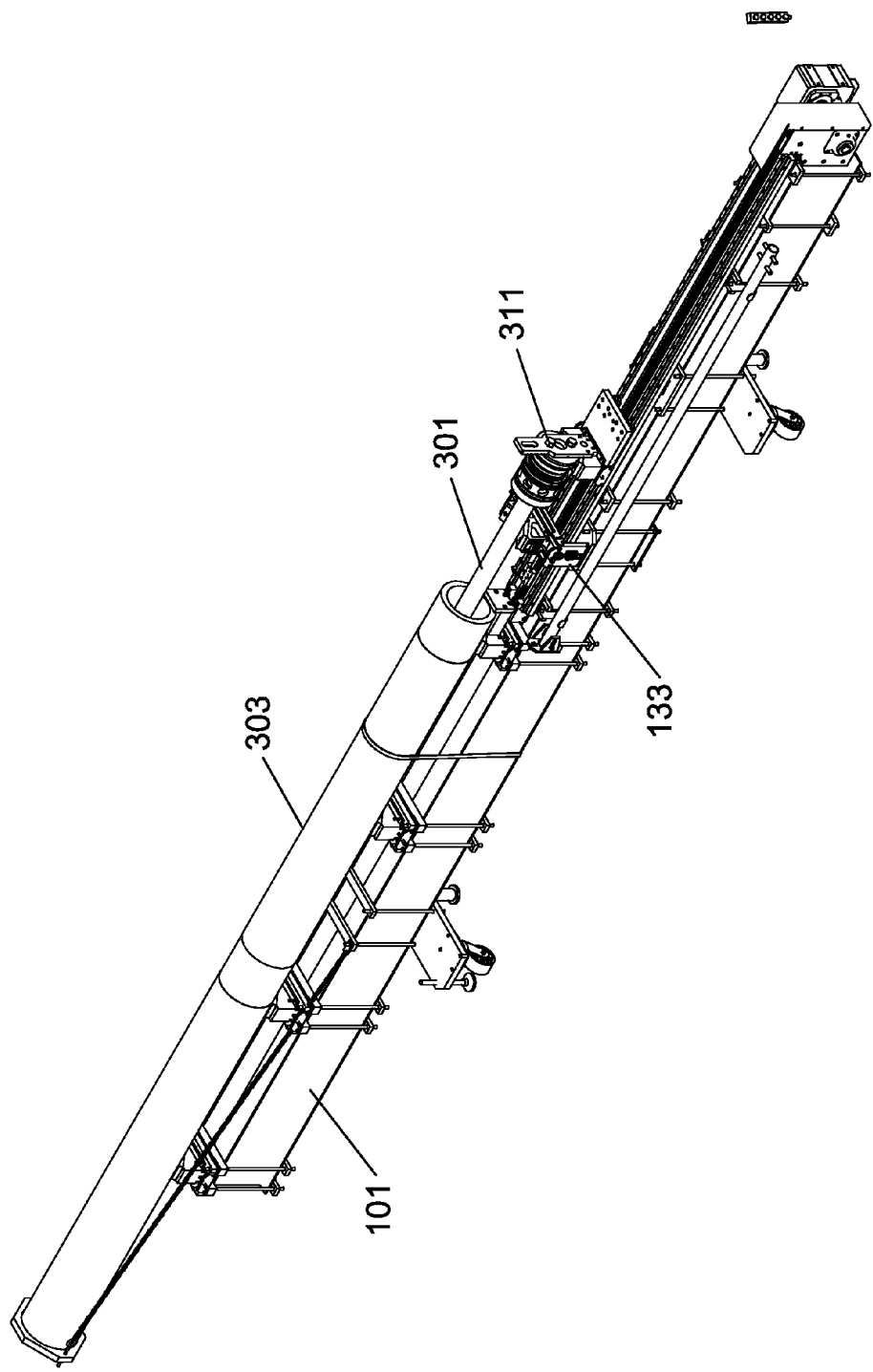
FIG. 4 is a perspective view of the piston and cylinder assembly fixture with a piston being inserted in a cylinder.

FIG. 4 is a perspective view of the piston and cylinder assembly fixture with a piston 301 being inserted in a cylinder 303. The piston support carriage 123 (see FIG. 1) can be seen moving the piston 301 into the cylinder 303. The support plates 133 can also be soon in FIG. 4. The piston support carriage moves along a linear path by way of the drive train 127 and related chain drive 125 or the like (see FIG. 1).

Figure 5:
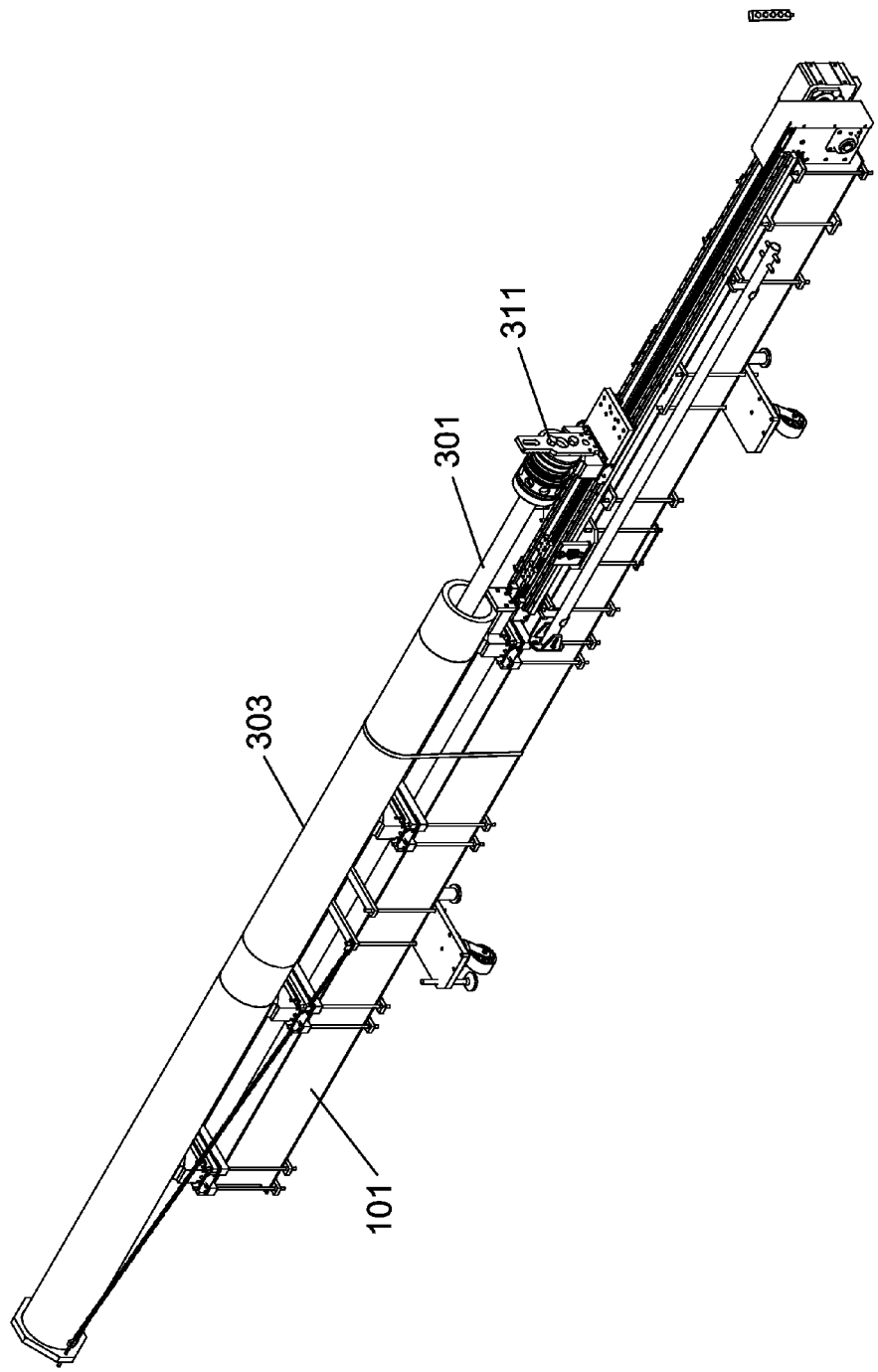
FIG. 5 is a perspective view of the piston and cylinder assembly fixture with a piston being further inserted in a cylinder and the removable vee block taken away.

FIG. 5 is a perspective view of the piston and cylinder assembly fixture with a piston 301 being further inserted in a cylinder 303 and the removable vee block carriage and removable vee block taken away as the piston 301 advances within the cylinder 303.

Figure 6:
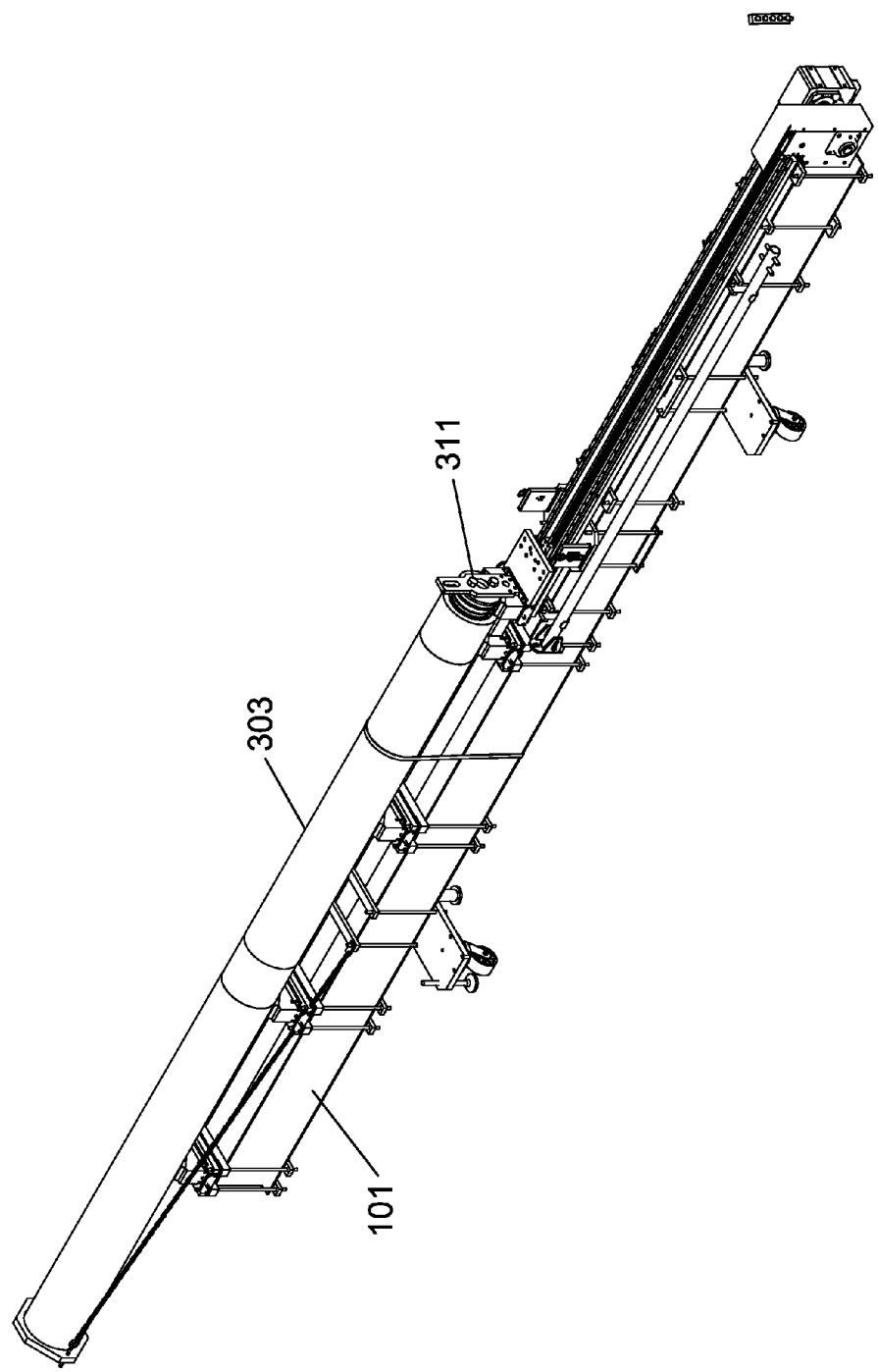
FIG. 6 is a perspective view of the piston and cylinder assembly fixture with the piston being inserted to the limit of the piston support carriage.
Figure 7:
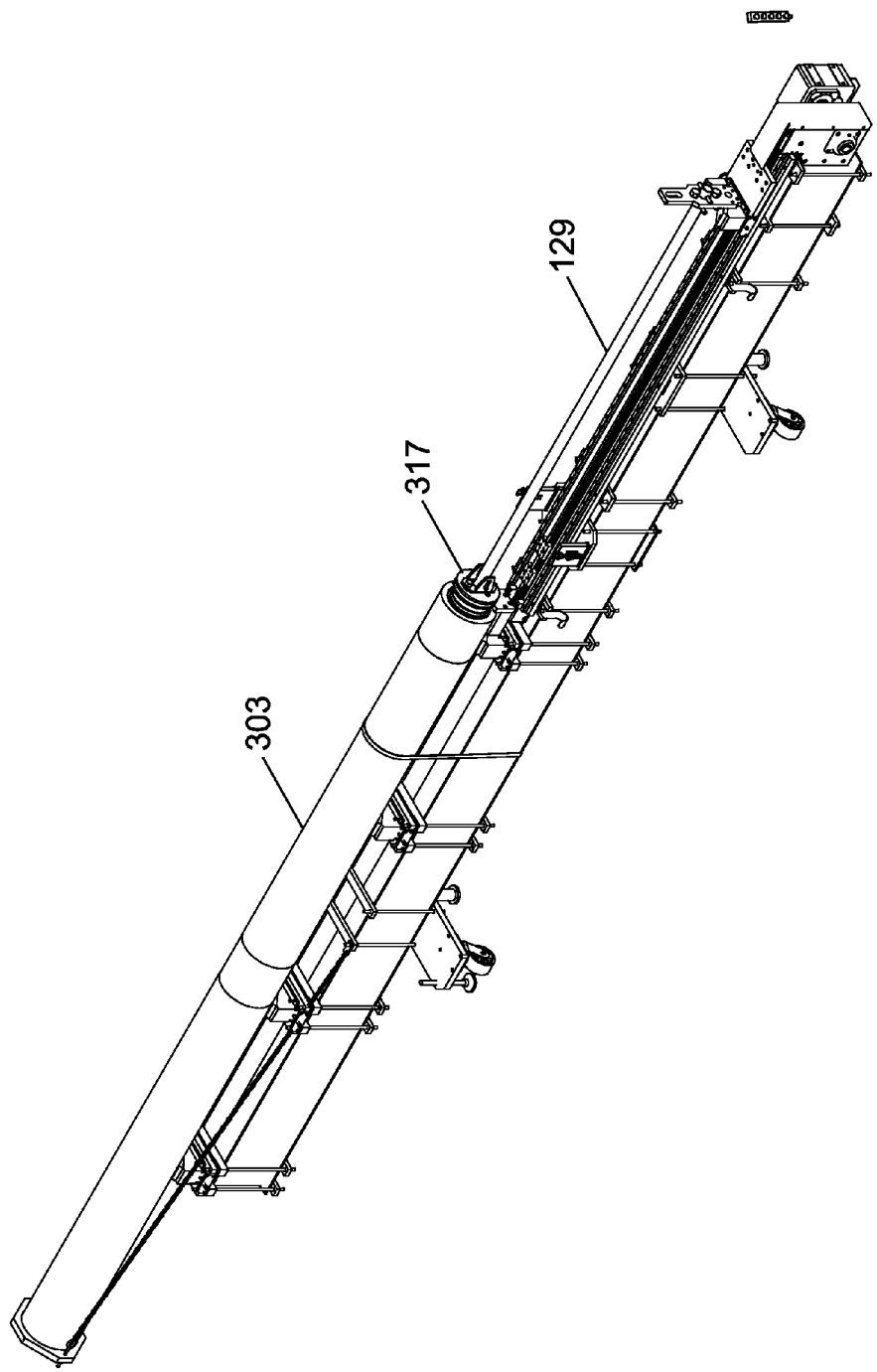
FIG. 7 is a perspective view of the piston and cylinder assembly fixture with a push rod being used for further insertion of the piston in the cylinder.

FIG. 6 is a perspective view of the piston and cylinder assembly fixture with the piston 301 being inserted to the limit of the piston support carriage 123. To facilitate complete insertion of the piston 301 in the cylinder 303, and as seen in FIG. 7, a push rod 129 is installed between the piston rear 317 and the piston support carriage 123. The push rod 129 is bolted or otherwise fastened to the piston rear 317 and attached to the carriage bulkhead for final positioning and complete insertion of the piston in the cylinder.

FIG. 7 is a perspective view of the piston and cylinder assembly fixture with a push rod being used for farther insertion of the piston in the cylinder.

Figure 8:
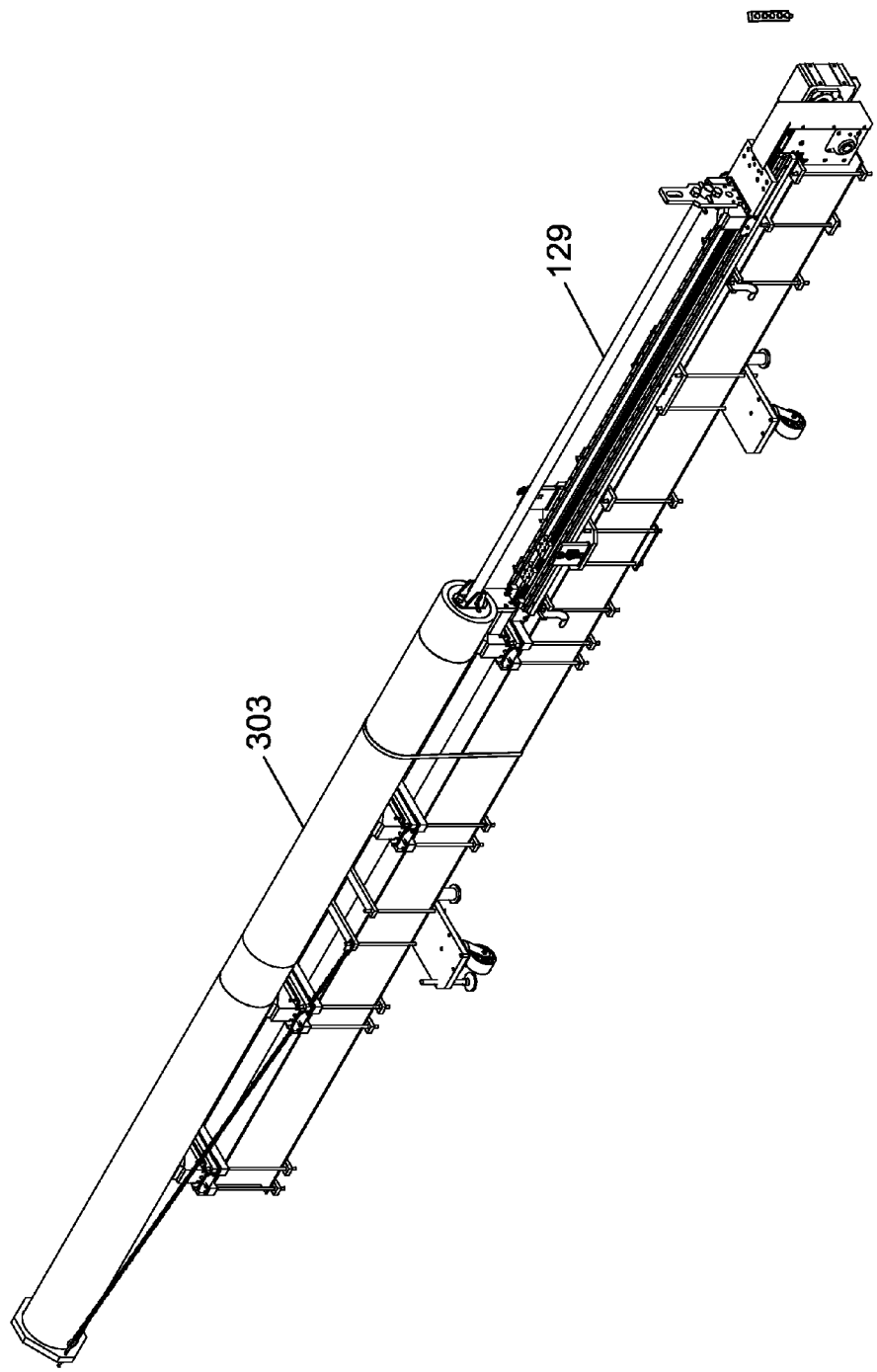
FIG. 8 is a perspective view of the piston and cylinder assembly fixture with the push rod moving the piston further into the cylinder.

FIG. 8 is a perspective view of the piston and cylinder assembly fixture with the push rod moving the piston further into the cylinder and the insertion process nearly complete. If the piston and cylinder assembly fixture is used to remove a piston from a cylinder, the method described and depicted by way of FIGS. 1-8 is reversed until the piston is fully extracted without damage.

Figure 9:
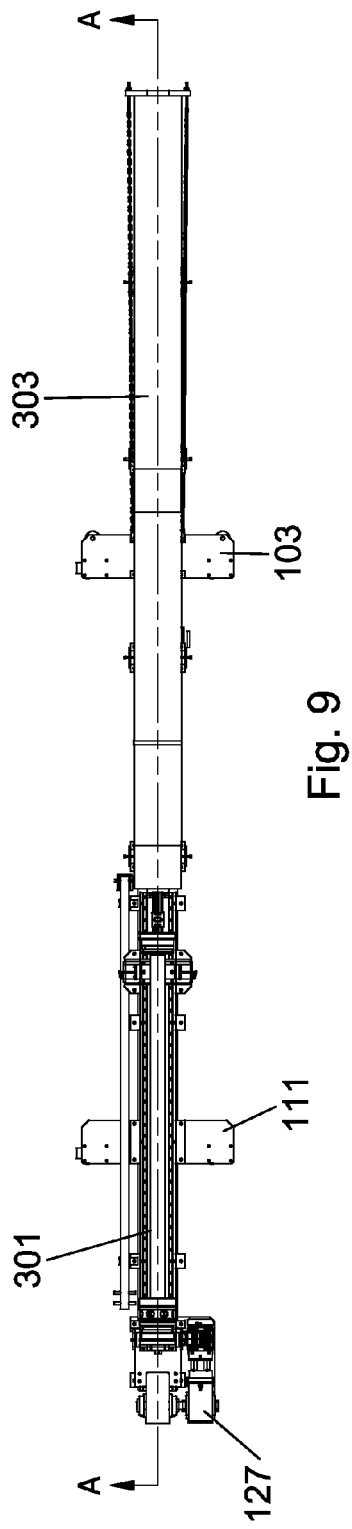
FIG. 9 is a top plan view of the piston and cylinder assembly fixture.

FIG. 9 is a top plan view of the piston and cylinder assembly fixture with a piston and cylinder ready for installation.

Figure 10:
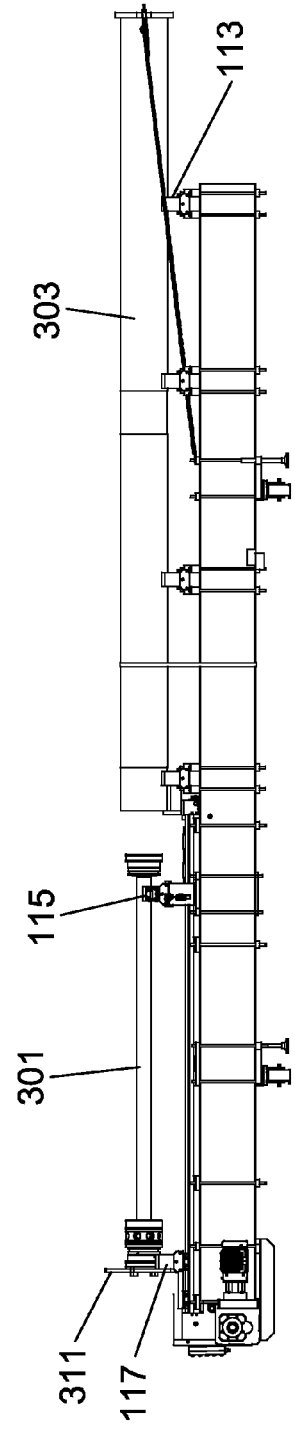
FIG. 10 is a side plan view of the piston and cylinder assembly fixture.

FIG. 10 is a side plan view of the piston and cylinder assembly fixture showing clearly the piston 301 in position along with the cylinder 303 in position and properly braced.

FIG. 11 is a cutaway view of the piston and cylinder assembly fixture taken along line A-A of FIG. 9.

The piston support carriage 123 (see FIG. 1) moves the piston in a linear manner toward or away from the cylinder 301. Various drive techniques are suitable for such motion, including a chain drive 125 and drive train 127 as depicted in FIG. 1. The drive train 127 may comprise, for example, an electric motor, a hydraulic motor, a pneumatic motor, an internal combustion engine, or the like. Other approaches include a worm gear, cables and a drive train, straps and a drive train, a moving belt, and the like. FIG. 12 is a close up view of the chain drive assembly of the piston and cylinder assembly fixture. In one embodiment of the present invention, a sprocket 1201 and a chain drive 125 (see FIG. 1) are used in combination with drive protrusions 1205 attached to the carriage or vee block assembly. The drive protrusions 1205 interact with chain drive links 1203 of the chain drive 125 in order to move the carriage or vee block assembly by way of the carriage bed 1207. Using drive protrusions 1205 and interaction with chain drive links 1203 creates an intended weak point in the system that will fail before damage to the cylinder or piston ensues. This failsafe drive mechanism results in the drive protrusions 1205 shearing off or being otherwise disengaged from the chain drive should something catastrophic happen during installation or removal of the piston and the cylinder, thus preventing damage to the cylinder or piston being assembled or retracted.

FIG. 13 is a close up view of an exemplary drive train of the piston and cylinder assembly fixture. While the drive train in the exemplary embodiment depicted herein is a drive motor 1301 such as an electric motor and gearbox 1303, other sources of rotational or linear motion may be employed, including but not limited to, hydraulic pumps and motors, internal combustion engines, air or liquid driven motors, and the like.

Figure 14:
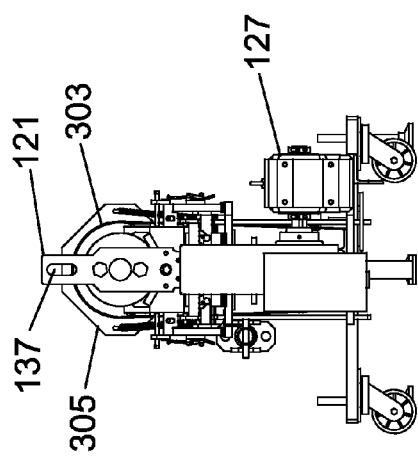
FIG. 14 is an end view of the piston and cylinder assembly fixture with the cylinder and piston in place.

FIG. 14 is an end view of the piston and cylinder assembly fixture with the cylinder and piston in place showing the carriage bulkhead 121 attached to the piston and the cylinder 303 in the background.

Figure 15:
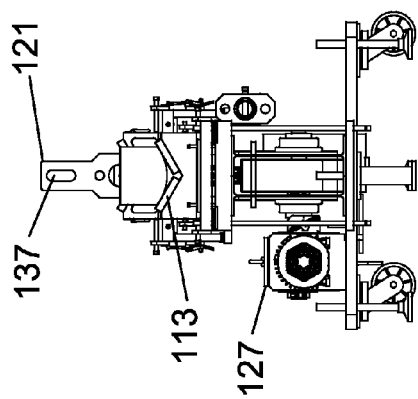
FIG. 15 is an end view of the piston and cylinder assembly fixture without as cylinder and piston in place.

FIG. 15 is an end view of the piston and cylinder assembly fixture without a cylinder and piston in place where instead a vee block 113 can be clearly seen.

Figure 16:
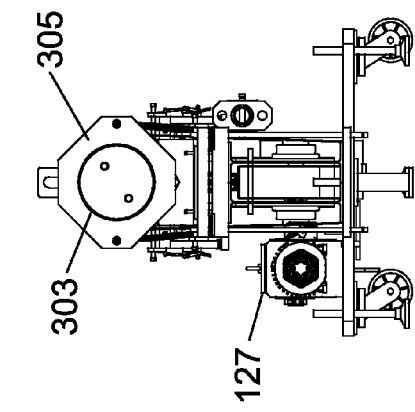
FIG. 16 is an opposite end view of the piston and cylinder assembly fixture with a cylinder and piston in place.

FIG. 16 is an opposite end view of the piston and cylinder assembly fixture with a cylinder and piston in place. The end stop bracket 305 is secured to the end of the cylinder 303 by way of threads, clamp, bolts, brackets, or the like.

FIG. 17 is a plan view of a vee block guide 113 of the piston and cylinder assembly fixture. The vee block guide 113 comprises a first vee block pad 1715 and a second vee block pad 1717 arranged in a vee shaped configuration. Other geometries that accommodate the cylinder and piston may also be employed, such as, for example, semi-circular or u-shaped blocks. The vee block pads are made from non-marking material such as a plastic or a metal. The vee block pads in use may be greased as the piston slides along each vee block during insertion or removal. The vee block pads are fastened to the vee block guide 113 with bolts, rivets, screws, adhesive, or the like, or may, in some embodiments of the present invention, be integral to the vee block guide 113. The vee block guide 113 is fastened to the frame 101 (see FIG. 1) by way of fasteners such as a first retention bolt 1709 and a second retention bolt 1711 with a retention bar 1713. During laser alignment, as previously described herein, the vee blocks can be adjusted horizontally by way of a first horizontal adjustment screw 1701 and a second horizontal adjustment screw 1703 that applies force to the vee block arrangement to displace the vee block in the direction of applied force from the appropriate adjustment screw. In a similar way, a first vertical adjustment screw 1705 and a second vertical adjustment screw 1707 are used to adjust the vertical position of each vee block. After vertical adjustments are made, in some embodiments of the present invention, metal shims may be utilized to strengthen the vee block's foundation at its new elevation.

For further definition of the vee block assembly, FIG. 18 is a rotated plan view of the vee block guide of FIG. 17 and FIG. 19 is a perspective view of the vee block guide of FIG. 17.

As previously described, during insertion or removal of a piston from a cylinder, one (or more) of the vee blocks, termed a removable vee block 115, is equipped with a release mechanism such as a latch or latches 131 to facilitate removal of the vee block at the necessary time during installation or removal of the piston from the cylinder. The latch assembly can be clearly seen. Various embodiments of the present invention may employ a variety of latches or other retention devices. FIG. 20 is a plan view of the removable vee block 115 of the piston and cylinder assembly fixture and FIG. 21 is a rotated plan view of the removable vee block of FIG. 20. FIG. 22 is a perspective view of the removable vee block of FIG. 20.

FIG. 23 is a plan view of a laser alignment block of the piston and cylinder assembly fixture. During laser alignment of the piston and cylinder assembly fixture, and as previously described, a laser line is used to set the correct vertical and horizontal positions of each vee block to ensure proper axial alignment of the piston to the cylinder. Laser alignment blocks 201, during alignment, are used to rest in each vee block and emulate the dimensions and axial center of the cylinder and related piston. A laser alignment sight 203 appears as a notch, channel or opening in the laser alignment block 201. The laser alignment block may be made from a plastic, a metal, wood, or the like. FIG. 24 is a rotated plan view of the laser alignment block of FIG. 23. FIG. 25 is a perspective view of the laser alignment block of FIG. 23. As one may well appreciate, various shapes and geometries of the laser alignment block may be used in various embodiments of the present invention.

Figure 29:
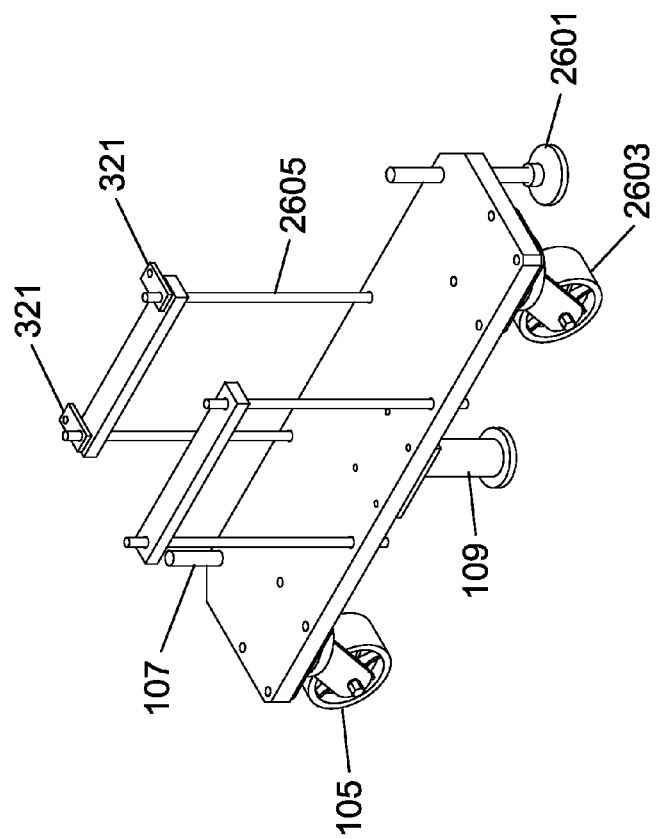
FIG. 29 is a perspective view of the carriage of FIG. 26.

To make the piston and cylinder assembly fixture movable for use or storage, a carriage and leveling arrangement is employed. FIG. 26 is a side plan view of a carriage of the piston and cylinder assembly fixture showing casters 105 and 2603. The casters may be made from a metal such as steel, and have a metal, rubber, or plastic rolling surface. The carriage is attached to the frame 101 (see FIG. 1) by way of mounting bolts 2605. Leveler screws are used to level each carriage and the overall piston and cylinder assembly fixture and include, in some embodiments of the present invention, three leveler screws amongst two carriages for stability. In FIG. 26, leveler screws 107 and 2601 can be seen. 109 is a foot operated movement arrester. FIG. 27 is a rotated side plan view of the carriage of FIG. 26. FIG. 28 is a bottom plan view of the carriage of FIG. 26 showing casters and leveler screws attached to the carriage. FIG. 29 is a perspective view of the carriage of FIG. 26. Grab hooks 321, attached to the mounting bolts 2605, can be seen. The grab hooks, in some embodiments of the present invention, are used to secure the chain 319 (see FIG. 3) during assembly (or disassembly) of a piston and cylinder pair.

Figure 30:
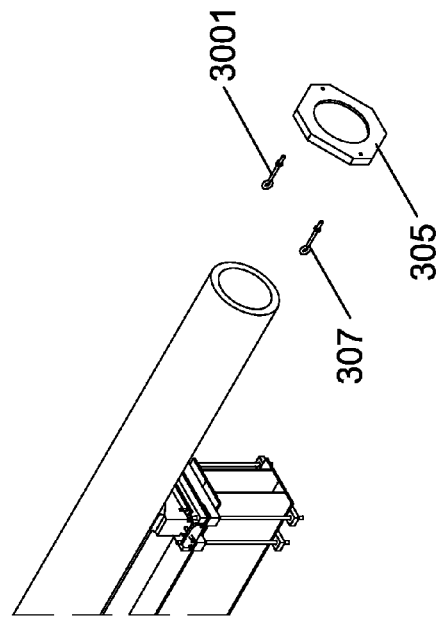
FIG. 30 is an exploded detail view of an end stop bracket of the piston and cylinder assembly fixture.

Lastly, FIG. 30 is an exploded detail view of an end stop bracket 305 of the piston and cylinder assembly fixture where two eye bolts 307 and 3001 can be seen. The end stop bracket and use thereof having been previously described herein.

While the piston and cylinder assembly fixture described and depicted herein portrays the insertion axis oriented in a horizontal plane with respect to ground, in some embodiments of the present invention the insertion axis may be oriented in a vertical plane with respect to ground.

The figures and the details provided by them, while describing the assembly fixture of the present invention, have been presented and described in such a way as to also allow one to make and use the assembly fixture.

It is, therefore, apparent that there has been provided, in accordance with the various objects of the present invention, an assembly fixture for large piston and cylinder assemblies and methods thereof. While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of this specification, claims, and the attached drawings.

What is claimed is:

1. A accumulator assembly fixture comprising:
   a frame;
   said frame having a first frame end and a second frame end;
   a first carriage and a second carriage wherein said first carriage is coupled to said first frame end and said second carriage is coupled to said second frame end;
   said first carriage and said second carriage each comprise one or more casters adapted to allow said frame to roll;
   said first carriage and said second carriage each further comprise one ore more leveling screws adapted to level and stabilize said frame;
   said first carriage and said second carriage each further comprise a movement arrester;
   a plurality of vee blocks attached to said frame;
   said first frame end having one or more vee blocks attached and adapted to hold an accumulator cylinder having a first cylinder end and a second cylinder end;
   said first frame end further adapted to hold an accumulator cylinder whose length extends beyond the end point of said first frame end;
   said second frame end having one or more vee blocks attached to it and adapted to hold an accumulator piston having a first piston end and a second piston end wherein said first piston end comprises a first seal and said second piston end comprises a second seal;
   said second cylinder end is removably fastened to said first frame end by a chain;
   a laser alignment system comprising a laser and a laser alignment block having a laser alignment sight;
   wherein each vee block is adapted to temporarily receive a laser alignment block and each vee block is further adapted to receive either an accumulator piston or an accumulator cylinder;
   adjustment hardware attached to each vee block for aligning each vee block along an insertion axis defined by the laser alignment system;
   an accumulator piston support carriage driven in a linear direction by a drive train; and
   a push rod removably attached to the accumulator piston support carriage and to an accumulator piston to be installed or removed from an accumulator cylinder adapted to allow said accumulator piston to be inserted into said accumulator cylinder such that said accumulator piston is fully encapsulated by said accumulator cylinder.

2. The accumulator assembly fixture of claim 1, wherein at least one vee block is a removable vee block.

3. The accumulator assembly fixture of claim 1, wherein at least one vee block is a carriage vee block.

4. The accumulator assembly fixture of claim 1, further comprising a carriage bulkhead operatively coupled to the accumulator piston support carriage.

5. The accumulator assembly fixture of claim 1, further comprising a chain drive to mechanically transfer energy from the drive train to the accumulator piston support carriage.

6. The accumulator assembly fixture of claim 1, further comprising a slot through at least a part of the accumulator piston support carriage.

7. The accumulator assembly fixture of claim 1, further comprising an end stop bracket for retaining an accumulator cylinder during insertion of an accumulator piston into the accumulator cylinder.

8. The accumulator assembly fixture of claim 7, further comprising a grab hook linked to the end stop bracket while the accumulator assembly fixture is in use.

9. The accumulator assembly fixture of claim 1, further comprising a safety strap for retaining said accumulator cylinder during insertion of the accumulator piston into the accumulator cylinder.

10. The accumulator assembly fixture of claim 1, further comprising a turned down section adapter for connecting to the accumulator cylinder while the accumulator piston is being installed in the accumulator cylinder.

11. The accumulator assembly fixture of claim 5, further comprising drive protrusions mechanically coupled to the accumulator piston support carriage and engaged with the drive chain along a carriage bed of the accumulator assembly fixture.

* * * * *